J. BARR & E. A. MYERS.
EDUCATIONAL APPLIANCE.
APPLICATION FILED MAR. 19, 1917.
1,228,391. Patented June 5, 1917.
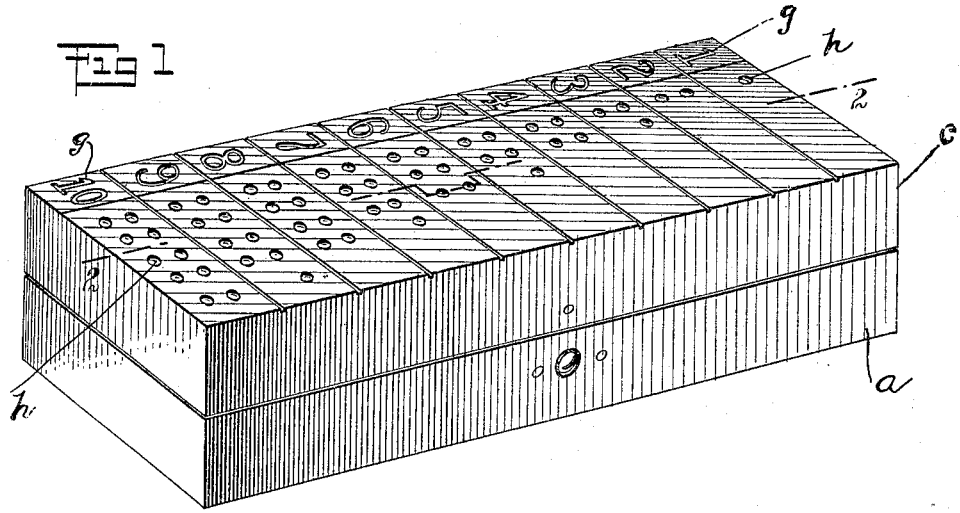
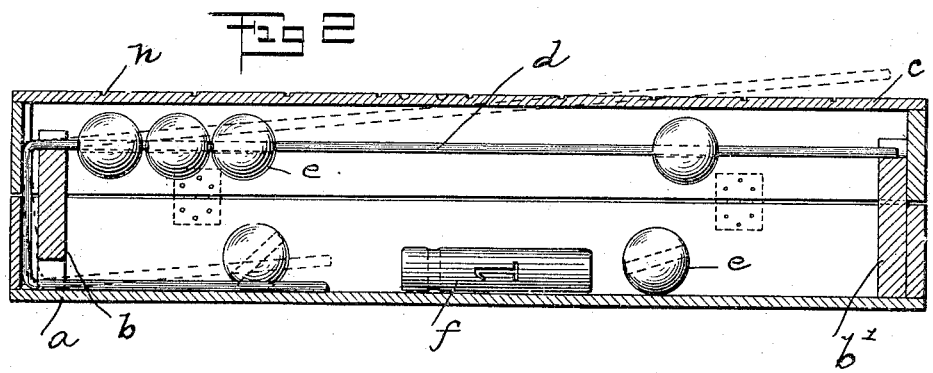
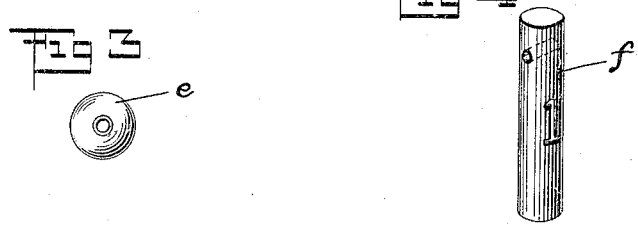
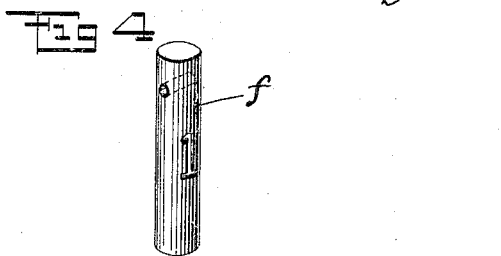
Jessie Barr
Emma A. Myers, Inventors.
By their Attorney
Frank P. Wentworth though the appliance with the rod shown in dotted lines in the raised position for

UNITED STATES PATENT OFFICE.

JESSIE BARR AND EMMA A. MYERS, OF BROOKLYN, NEW YORK.

EDUCATIONAL APPLIANCE.

1,228,391.  Specification of Letters Patent.  Patented June 5, 1917.

Application filed March 19, 1917. Serial No. 155,727.

*To all whom it may concern:*

Be it known that we, JESSIE BARR and EMMA A. MYERS, citizens of the United States, both residing at the borough of Brooklyn, city of New York, county of Kings, and State of New York, have invented certain new and useful Improvements in Educational Appliances, of which the following is a specification, reference being had therein to the accompanying drawings, which form a part thereof.

Our invention relates to educational appliances, and more particularly to an article adapted for use in instructing the elementary principles of arithmetic.

In the science of pedagogy, it is now generally recognized that with young children particularly individual instruction is more or less necessary because in class instruction the minds of some children are not as alert as those of others, thus preventing advance in their studies by some of the children, due to the fact that the progress of instruction must be adapted to the less active minds. It is also desirable in class teaching to keep all of the children more or less constantly employed, not only in the interest of discipline or deportment, but also to insure progress in learning.

By our invention, we provide an appliance adapted for the individual use of each pupil, when receiving instruction in arithmetic, thus permitting the concentration of the mind of each pupil upon his or her appliance during the course of instruction while permitting the instructor to give individual attention or instruction to any backward child without interfering with the progress in learning, of the other children in the class. At the same time, the use of this appliance will permit each child, in a measure, to pursue his or her studies alone, while special instruction is being given to the more backward.

The appliance is so constructed that its working condition may be modified from time to time in accordance with the progress of the studies of the class, or of the individual, by the removal from, or addition to, a rod embodied in the appliance of the invention, of movable beads or other elements. In conjunction with this abacus-like structure, we provide devices which are both visual and sensible to the touch to assist the pupils while working alone, in securing certain combinations of beads or elements. We also provide counters or blocks having raised digits or numbers thereon, which may be substituted for the ordinary abacus beads for studies slightly in advance of ordinary addition or subtraction.

The appliance is so constructed as to be compact in form; to permit the ready insertion or removal of beads or blocks from the rod on which they are adapted to have movement, and to permit the storage of these beads or blocks in a manner convenient for their insertion upon or removal from the said rod by each pupil.

The invention consists primarily in an educational appliance embodying therein a casing, a rod having one end thereof movably mounted in said casing and the other end thereof seated in the opposite side of said casing, the manner of mounting said rod being such as to permit the mounting or removal of elements therefrom, and a plurality of slidable elements adapted to be removably mounted upon said rod; and in such other novel features of construction and combination of parts as are hereinafter set forth and described, and more particularly pointed out in the claims hereto appended.

Referring to the drawings,

Figure 1 is a perspective view of an appliance made in accordance with our invention, in the closed position;

Fig. 2 is a vertical longitudinal section through the appliance with the rod shown in dotted lines in the raised position for permitting the removal or mounting of beads or blocks thereon;

Fig. 3 is a view of one of the beads; and

Fig. 4 is a view of one of the blocks.

Like letters refer to like parts throughout the several views.

In the embodiment of our invention shown in the drawings, we employ a box body *a* about the size of the ordinary pencil case having projections *b* and *b'* at the opposite ends thereof. Hinged on said body *a* is a cover *c* of substantially the same dimensions as the box body *a* to permit the closing of the box under all conditions of use, the projections *b* and *b'* being positioned within the edges of the box body *a* to permit the closing of this cover *c*. Mounted in one projection *b* is a rod *d*, preferably formed of round wire, which extends from the projection *b* into engagement with a suitable socket in the projection *b'* so as to cause this rod to extend entirely across the casing from one side thereof to the other and resist displacement when the beads or blocks are moved along same. To prevent the removal of the rod $d$ in its entirety from the casing, we connect said rod and said projection $b$ by providing a vertical opening in said projection which is of a diameter greater than the rod $d$ so as to permit a limited swinging movement of said rod, the end of the rod $d$ being inturned and projecting below the projection $b$ in a manner to prevent the removal of the rod from the box. In conjunction with this casing, we preferably provide two groups of elements, one consisting of twenty (20) round beads, the openings through which permit them to slide freely upon the rod $d$ and twenty (20) elongated blocks $f$ having impressed thereon, either in intaglio or in relief, the digits or numbers one to twenty respectively. These elements may be grouped upon the rod in any desired number, and may be freely mounted upon or removed from said rod according to the progress of instruction. The beads $e$ are used as ordinary abacus beads, for instruction in counting, addition or subtracting; while the blocks $f$ are used in more advanced studies as in counting by two's, three's, etc.

Impressed upon the cover $c$, either in relief or in intaglio, (preferably the latter) so that they may be readily felt by the pupil, are the digits or numbers one to ten indicated at $g$ having positioned adjacent each digit or number a group of elevations or depressions $h$ indicating the number of beads or blocks corresponding to the digit or number with which each group is associated. By means of these indices upon the cover, a pupil is enabled to select the number of beads or blocks desired to be mounted upon the rod, and to group them upon a rod or move them to secure the required result. At the same time, the results of the manipulation of the beads or blocks may be determined by reference to the cover. By this arrangement the appliance is adapted for use in instructing the blind as well as for the instruction of normal children.

In use, an educational appliance made in accordance with our invention, is given each child, who is required to mount or remove the beads or blocks $e$ or $f$ upon the rod $d$ in accordance with the requirements of the instructor. During the course of instruction, each child is at liberty to practise the grouping of the beads or blocks in different ways to indicate different results, and the instructor is at liberty to assist inapt pupils without interfering with the studies of other pupils. Each pupil is at liberty to progress with his or her studies in accordance with his or her aptitude for learning, and the attention of each pupil is concentrated upon an individual appliance to an extent to promote progress in his or her studies.

While we provide twenty beads and twenty blocks, any number of either of these may be used upon the rod $d$ at the same time, this rod being movable in its support for the purpose of permitting the use of a different number of such beads or blocks, or the substitution for a group of elements of one character for a group of elements of another character.

Having described the invention what we claim as new and desire to have protected by Letters Patent is:

1. An educational appliance embodying therein a casing, a rod having one end thereof movably mounted in said casing and the other end thereof seated in the opposite side of said casing, whereby the mounting of movable elements upon, and their removal from, said rod is permitted, and a plurality of elements each having an opening therethrough whereby it may be removably mounted upon said rod, and may slide freely thereon.

2. An educational appliance embodying therein a casing having projections at the opposite sides thereof, one of said projections having an opening therein, a rod having a portion thereof seated in said opening and an end turned inwardly of said casing below said projection, said rod projecting across said casing and having its far end seated in said other projection, the portion of said rod in said opening being of smaller cross section than said opening whereby the far end of said rod may swing away from said other projection to permit elements to be mounted thereon or removed therefrom, and a plurality of elements each having an opening therethrough whereby it may be removably mounted upon said rod, and may slide freely thereon.

3. An educational appliance embodying therein a casing, a rod having one end thereof movably mounted in said casing and the other end thereof seated in the opposite side of said casing, whereby the mounting of movable elements upon, and their removal from, said rod is permitted, a plurality of elements each having an opening therethrough whereby it may be removably mounted upon said rod, and may slide freely thereon, and a cover for said casing having impressed thereon digits or numerals, with a corresponding number of unitary indices associated with each digit or number, said digits or numbers and said indices being out of the plane of said cover whereby they are both visual and sensible to touch.

4. An educational appliance embodying therein a casing having projections at the opposite ends thereof, one of said projections having an opening therein, a rod having a portion thereof seated in said opening, and an end turned inwardly of said casing below said projection, said rod projecting across said casing and having its free end seated in said other projection, the portion of said rod in said opening being of smaller cross section than said opening whereby the far end of said rod may swing away from said other projection to permit elements to be mounted thereon or removed therefrom, a plurality of elements each having an opening therethrough whereby it may be removably mounted upon said rod, and may slide freely thereon, and a cover for said casing having impressed thereon digits or numerals, with a corresponding number of unitary indices associated with each digit or number said digits or numbers and said indices being out of the plane of said cover whereby they are both visual and sensible to touch.

In witness whereof we have hereunto affixed our signatures in the presence of two subscribing witnesses, this 17th day of March, 1917.

JESSIE BARR.
EMMA A. MYERS.

Witnesses:
CLARICE FRANCK,
BERTHA MUELLER.

Copies of this patent may be obtained for five cents each, by addressing the "Commissioner of Patents, Washington, D. C."